United States Patent
Fux

(10) Patent No.: US 8,905,412 B2
(45) Date of Patent: Dec. 9, 2014

(54) WHEELED CONTAINERS FOR BEDDING PRODUCTS INCLUDING MATTRESSES AND MATTRESS TOPPERS

(71) Applicant: Comfort Revolution, LLC, West Long Branch, NJ (US)

(72) Inventor: Michael Fux, Monmouth Beach, NJ (US)

(73) Assignee: Comfort Revolution, LLC, West Long Branch, NJ (US)

(*) Notice: Subject to any disclaimer, the term of this patent is extended or adjusted under 35 U.S.C. 154(b) by 0 days.

(21) Appl. No.: 13/850,155

(22) Filed: Mar. 25, 2013

(65) Prior Publication Data
US 2013/0300077 A1  Nov. 14, 2013

Related U.S. Application Data

(63) Continuation of application No. 29/433,971, filed on Oct. 8, 2012, now Pat. No. Des. 690,510.

(60) Provisional application No. 61/757,106, filed on Jan. 26, 2013, provisional application No. 61/614,952, filed on Mar. 23, 2012.

(51) Int. Cl.
*B62B 1/00* (2006.01)
*B62B 1/18* (2006.01)

(52) U.S. Cl.
CPC ........................................ *B62B 1/18* (2013.01)
USPC ...................................................... 280/47.26

(58) Field of Classification Search
USPC ............. 280/35, 47.131, 47.17, 47.34; 5/510, 5/703, 737, 738, 484, 699; 294/149, 152; 211/27–28; 190/18 A
See application file for complete search history.

(56) References Cited

U.S. PATENT DOCUMENTS

| | | | |
|---|---|---|---|
| 4,711,067 A | 12/1987 | Magni | |
| 4,928,800 A * | 5/1990 | Green et al. | 190/115 |
| D351,726 S | 10/1994 | Lin | |
| 6,039,243 A | 3/2000 | Lickton | |
| D438,005 S | 2/2001 | Tiramani et al. | |
| D444,946 S | 7/2001 | Klamm | |
| 6,315,368 B1 | 11/2001 | Kuo | |
| D462,169 S | 9/2002 | Giovanni | |

(Continued)

OTHER PUBLICATIONS

"The World's Toughest Carts," Toter Incorporated, www.toter.com, 2008, 3 pages.

(Continued)

*Primary Examiner* — John Walters
*Assistant Examiner* — James Triggs
(74) *Attorney, Agent, or Firm* — Doherty IP Law Group LLC

(57) ABSTRACT

A wheeled container for bedding products includes a container having an upper end and a lower end with a bottom surface that extends to a lower edge of the container, a pair of wheels rotatably mounted to the lower edge of the container, and a handle mounted to the container, on the same side of the container as the pair of wheels. A bedding product, such as a mattress or in which a bottom face of the container is parallel to the ground, and a moving configuration in which the container is tilted onto the pair of wheels for rolling the container over the ground. When the container has been rolled to a desired location, it may be returned to the upright, storage configuration.

18 Claims, 13 Drawing Sheets

(56) References Cited

U.S. PATENT DOCUMENTS

| | | |
|---|---|---|
| D465,085 S | 11/2002 | Chen |
| 6,536,568 B1 * | 3/2003 | Tong .............................. 190/101 |
| D644,436 S | 9/2011 | Buller |
| 8,016,089 B1 * | 9/2011 | McNichols ........................ 190/8 |
| D675,016 S | 1/2013 | Van Overbeke |
| D675,017 S | 1/2013 | Van Overbeke |
| 8,365,911 B2 | 2/2013 | Oh |
| 8,439,174 B1 * | 5/2013 | Miranda ............................ 190/2 |
| 2005/0269791 A1 | 12/2005 | Hoiriis et al. |
| 2006/0037824 A1 * | 2/2006 | Park et al. ..................... 190/110 |
| 2007/0074983 A1 | 4/2007 | Oh |
| 2008/0185250 A1 * | 8/2008 | Martins et al. ................ 190/108 |
| 2009/0101460 A1 | 4/2009 | Justham et al. |
| 2009/0145710 A1 * | 6/2009 | Roncato ......................... 190/103 |
| 2009/0236195 A1 * | 9/2009 | Lupkas ......................... 190/103 |
| 2013/0081964 A1 | 4/2013 | Oh |

OTHER PUBLICATIONS

"Custom Product Design & Manufacturing," Meese Inc., www.modroto.com, 2012, 3 pages.

"Custom Rotational Molded Parts," Sterling Technologies, www.sterlingrotationalmolding.com, 2012, 4 pages.

* cited by examiner

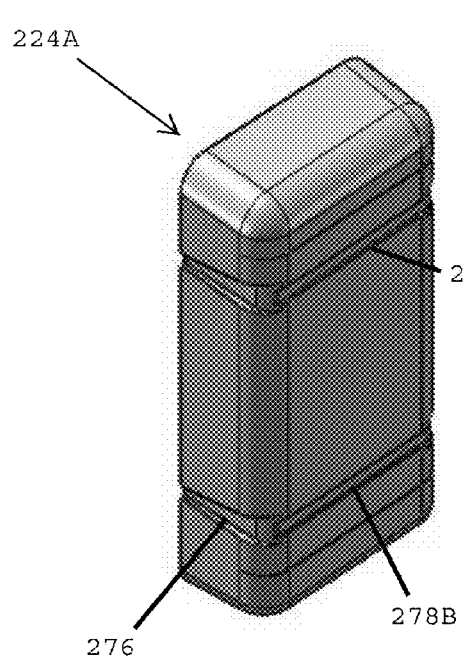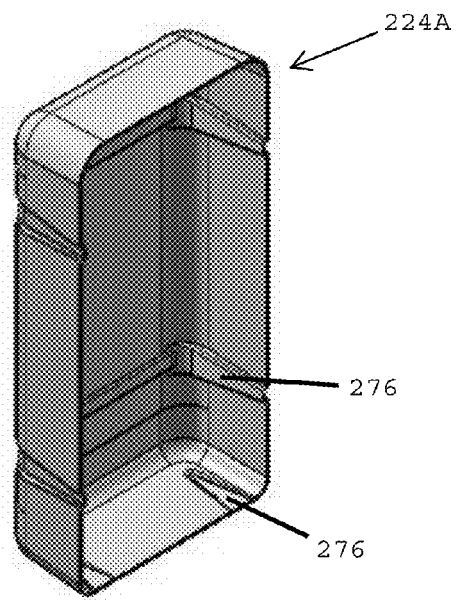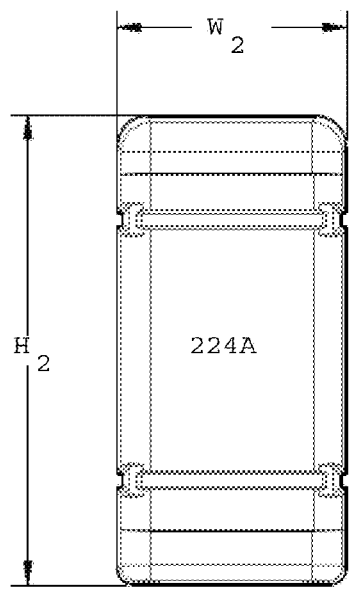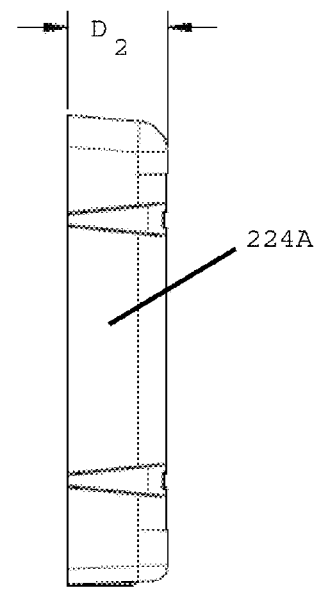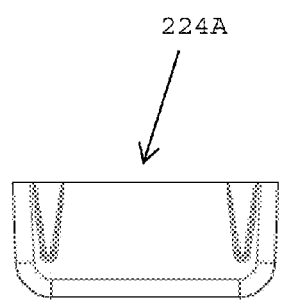
FIG. 9A
FIG. 9B
FIG. 9C
FIG. 9D
FIG. 9E

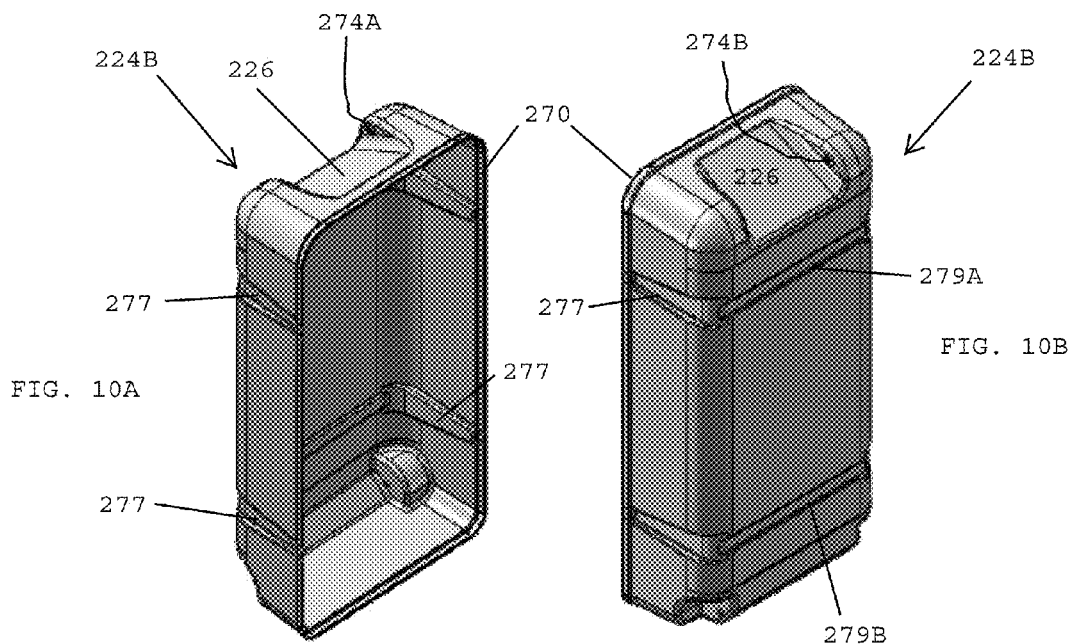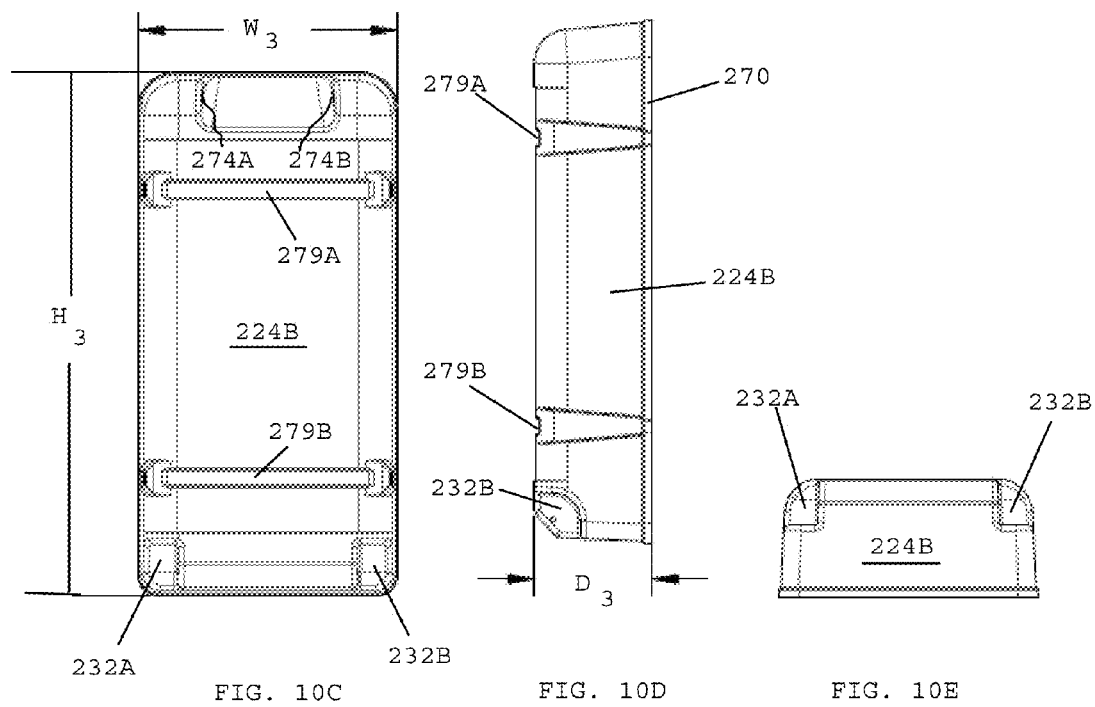

WHEELED CONTAINERS FOR BEDDING PRODUCTS INCLUDING MATTRESSES AND MATTRESS TOPPERS

CROSS REFERENCE TO RELATED APPLICATIONS

The present application claims benefit of U.S. Provisional Application No. 61/757,106, filed Jan. 26, 2013, entitled "WHEELED MATTRESS TOPPER CADDIES AND REUSEABLE CONTAINERS," U.S. Design patent application Ser. No. 29/433,971, filed Oct. 8, 2012, entitled, "CONTAINER," and U.S. Provisional Application No. 61/614,952, filed Mar. 23, 2012, entitled, "WHEELED MATTRESS CADDY AND REUSEABLE CONTAINER," the disclosures of which are hereby incorporated by reference herein.

FIELD OF THE INVENTION

The present application is generally related to bedding products and is more particularly related to containers for mattresses, mattress toppers and bulky bedding products.

BACKGROUND OF THE INVENTION

Mattresses are bulky items that are difficult to transport and move from a retail store to a home. Traditionally, mattresses have been packaged and sold in a flat configuration, whereby the mattresses have the same size and dimension in a store as they do when placed atop a box spring or mattress support to make a bed. Recently, there have been efforts directed to compressing mattresses before placing the mattresses in a box, and there is now an entire industry dedicated to compressing foam and coil mattresses for retail packaging.

Similarly, mattress toppers are bulky items that are difficult to transport from a retail establishment to a home. There have been a number of efforts directed to compressing mattress toppers and placing the compressed mattress toppers in packaging for retail display.

In spite of these advances there remains a need for improved containers for mattresses, mattress toppers, and bulky bedding products that make it easier for consumers to transport these items from retail stores to the home.

SUMMARY OF THE INVENTION

In one embodiment, a mattress is compressed and packed into a wheeled container. The container preferably has a handle and wheels that make it easier for a consumer to move the mattress in the store and at home.

In one embodiment, the container may be a plastic tote/can/cart with an integrated handle and wheels. One benefit of using plastic is that retailers may effectively eliminate or reduce extra packaging materials. By providing a generally rigid container to house a mattress, the container may offer a secondary use for the packaging materials. A consumer may utilize the plastic tote/can/cart as a storage device or possibly even a garbage can. Thus, there will be little or no waste. The plastic container will also better protect the mattress.

In one embodiment, a wheeled container for bedding products includes a container having an upper end and a lower end with a bottom surface that extends to a lower edge of the container. The container preferably has a pair of wheels rotatably mounted to the container at the lower edge of the container, and a handle mounted to the container, whereby the handle is mounted on the same side of the container as the pair of wheels. A bedding product is desirably disposed inside the container. The container has a storage configuration (e.g., for storing, shipping and stacking the container) in which a bottom face of the container is parallel to the ground, and a moving configuration in which the container is tilted onto the pair of wheels for rolling the container over the ground. In one embodiment, when the container is in the moving configuration, the bottom face of the container is non-parallel to the ground.

In one embodiment, the upper end of the container has a recess formed therein and the handle extends across the recess. In one embodiment, the handle is secured to the upper end of the container. In one embodiment, the handle is pivotally secured to the container. In one embodiment, the handle is seated within the recess when the container is in the storage configuration and is rotated away from the recess when the container is in the moving configuration.

In one embodiment, the container preferably includes a recess formed in a vertical wall of the container. The recess preferably extends between the upper and lower ends of the container, whereby the handle is disposed within the recess and the handle has an upper end that is accessible at the upper end of the container. In one embodiment, the handle has a base that is fixed to the container and a hand grip that is extendible away from the fixed base.

In one embodiment, the container has a box-like shape with the pair of wheels being mounted along a lower rear edge of the container and the handle being accessible at an upper rear edge of container. The box-like shape may facilitate stacking of a plurality of the containers atop and adjacent one another during shipping and storage.

In one embodiment, the bedding product is a folded and compressed mattress that is disposed within a sealed flexible bag, which, in turn, is disposed within the container. In one embodiment, the mattress is a compressed memory foam mattress. In one embodiment, the bedding product is a mattress topper.

In one embodiment, the container has a bottom container part having a container opening adapted to receive the bedding product and a top lid that covers the container opening of the bottom container part for storing the bedding product in the container. In one embodiment, the top lid is pivotally connected with the bottom container part.

In one embodiment, the container preferably has a front container half and a rear container half that are assembled together for storing the bedding product within the container, The wheeled container desirably has one or more securing straps that are wrapped around the container for holding the front and rear container halves together.

In one embodiment, the first and second roller wheels are rotatably mounted to the lower end of the rear container half and the handle is mounted to the upper end of the rear container half.

In one embodiment, a wheeled container for a mattress preferably has a folded mattress placed inside a sealed, flexible bag, a front container half having an upper end and a lower end, and a rear container half having an upper end and a lower end, whereby the front and rear container halves are assembled together for storing the folded mattress between the assembled front and rear container halves. In one embodiment, at least one strap is wrapped around the front and rear container halves for holding the front and rear container halves together. The container preferably has a pair of wheels rotatably mounted to the container at a lower end of the rear container half, and a handle secured to the container and being accessible at an upper end of the rear container half. The container desirably has a storage configuration in which a bottom face of the container is parallel to the ground, and a moving configuration in which the container is tilted onto the pair of wheels for rolling the container over the ground to a desired location. In one embodiment, the container has a box-like shape for being stackable and the front and rear container halves are made of thermoformed polymers.

In one embodiment, the folded mattress is a memory foam mattress that is compressed and folded for being stored inside the container, and the sealed, flexible bag is hermetically sealed.

In one embodiment, a plurality of wheeled containers for bedding products are provided that are stackable atop and adjacent one another when the containers are in the storage configuration, or when the containers are being shipped.

In one embodiment, the plastic container preferably includes an outer label or sheet placed over the outer surface of the container. The label may have printed foil graphics. The outer label or sheet may be glued or applied to the outer surface using well known fastening methodologies.

In one embodiment, the plastic container may be embossed with a label and/or design.

These and other preferred embodiments of the present invention will be described in more detail herein.

BRIEF DESCRIPTION OF THE DRAWINGS

FIGS. 9A-9E show the front container half of FIG. 8.

FIGS. 10A-10E show the rear container half of FIG. 8.

DETAILED DESCRIPTION

Figure 1:
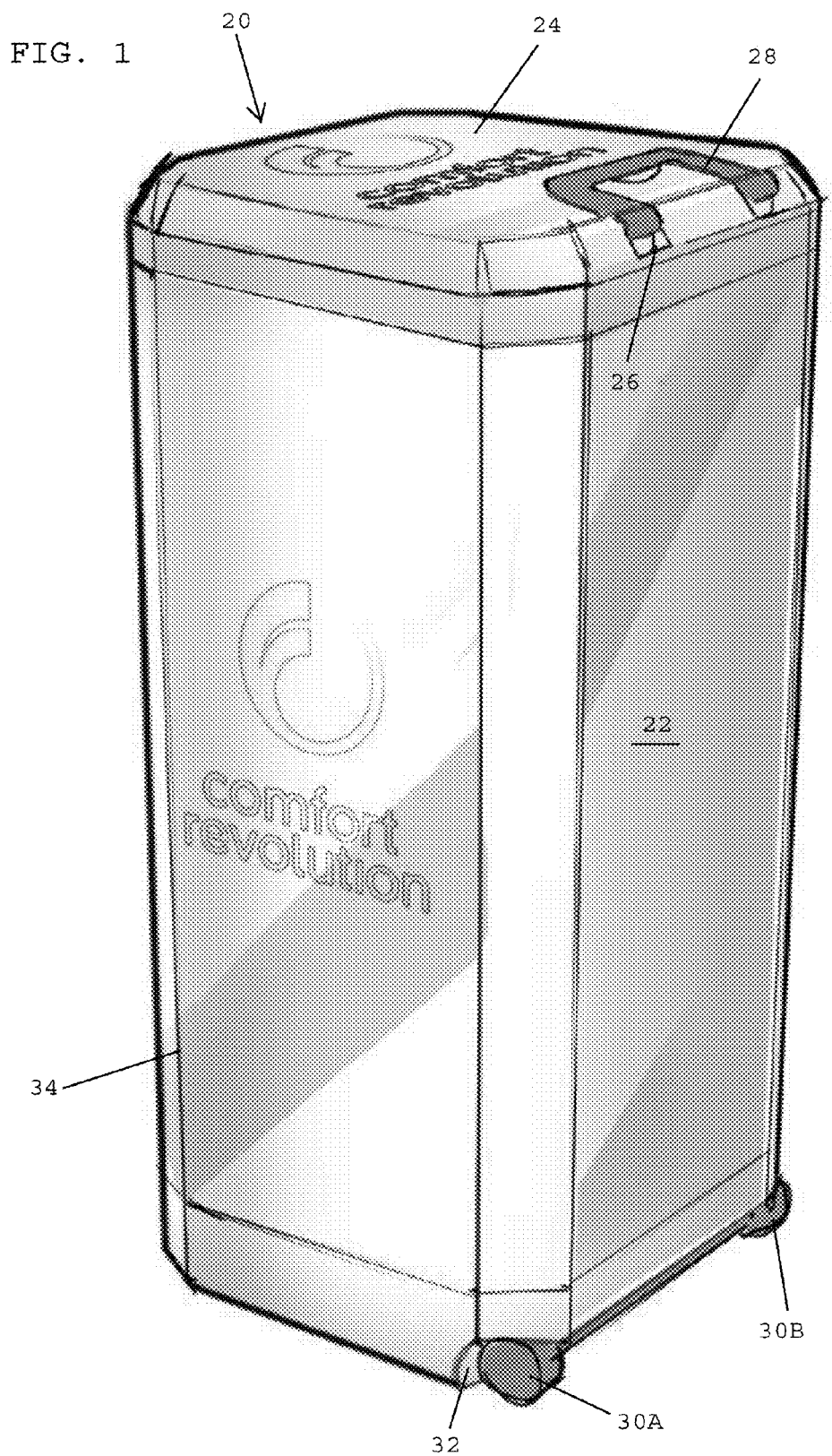
FIG. 1 shows a perspective view of a wheeled mattress caddy having a recessed handle and wheels, in accordance with one embodiment of the present invention.

Referring to FIG. 1, in one embodiment, a wheeled mattress caddy 20 for storing a compressed mattress desirably includes a container 22 having a lid 24 that covers an opening at an upper end of the container 22. In one embodiment, the lid 24 is desirably hingedly secured to the upper end of the container. The lid 24 may be opened for providing access to the container opening so that a compressed mattress may be placed into and/or removed from the container 22.

In one embodiment, the lid 24 preferably has a recess 26 formed therein that is adapted to received a handle 28. The handle is preferably pivotally secured to the lid 24 so that it may be moved between a retracted position whereby the handle sits within the recess and an extended position whereby the handle is pulled from the recess for moving the wheeled mattress caddy 20. With the handles 28 in a recessed position, a plurality of mattress caddies 22 are stackable atop one another.

In one embodiment, the container 22 has side walls. The side walls may be embossed with a label or a design. In one embodiment, the lid may be embossed with a label or a design.

The mattress caddy 20 is preferably designed for being stacked next to and atop other similarly configured mattress caddies. In one embodiment, the mattress caddy 20 has a box-like shape having a flat top, four flat sides and a flat bottom. The box-like shape enables the container 22 to be stacked next to and/or atop other similarly configured and dimensioned mattress caddies.

The wheeled mattress caddy 20 preferably includes roller wheels 30A, 30B that are positioned within a cutout 32 formed along a lower edge of the container 22. The wheels 30A, 30B are preferably positioned on the same side of the container 22 as the handle 28. The wheels are preferably recessed so that they do not extend outside the perimeter of the container 22. Although the present invention is not limited by any particular theory of operation, providing recessed wheels 30A, 30B that lie within the perimeter of the container 22 results in a smaller footprint around the base of the container so that adjacent containers may be stacked closely together.

The mattress caddy 30 may be provided in different sizes for accommodating mattresses having different sizes, e.g., King size, Queen size, twin, etc.

In one embodiment, the wheeled mattress caddy 20 may be made of plastic such as the wheeled rollout carts sold by Toter, Inc. of Statesville, N.C., www.totercom, the disclosure of which is hereby incorporated by reference herein.

The plastic materials preferably protect the mattress disposed within the container 22. The plastic materials are preferably rugged so that the mattress caddy may be re-used as a garbage can, recycling bin, or storage container after the mattress has been removed from the caddy.

In one embodiment, the wheeled mattress caddy 20 may be made of plastic using the rotational molding technology provided by MOD Custom Rotomolding of Ashtabula, Ohio, which is a custom molding division of Meese Orbitron Dunne Company, www.modrota.com, the disclosure of which is hereby incorporated by reference herein. MOD is a founding member of the Association of Rotational Molders International and a perennial winner of its rotomolding awards for excellence. MOD designs, develops, and manufactures a diverse array of plastic containers, carts, tanks and other products for hundreds of tough applications in the chemical, food, healthcare, laundry, lighting, home and garden and other industries. The company consistently ranks at the top of the Plastics News annual list of the country's largest rotational molders. In addition to its rotational molding and custom design engineering services, the company also offers a host of ancillary in-house services including a state-of-the-art powder coating operation, metal fabrication and cut and sew operations. MOD is the first rotomolder in North America to purchase the automated Leonardo rotational molding system and currently operates four manufacturing facilities in La Mirada, Calif.; Saddle Brook, N.J.; Ashtabula, Ohio and Madison, Ind. to provide fast, efficient product distribution at the lowest freight cost possible throughout the country and the world.

In one embodiment, the wheeled mattress caddy 20 may be made of plastic using the rotationally molded plastic technology disclosed by Sterling Technologies of Lake City, Pa., www.sterlingrotationalmolding.com, the disclosure of which is hereby incorporated by reference herein. Sterling provides product design, prototyping, tooling fabrication and management, production feasibility and optimization along with vast finishing options for bringing products to market. Sterling produces a wide range custom rotomolded parts and components and is capable of molding very intricate parts in a wide range of sizes, colors, and textures, and with graphics and special finishes.

In one embodiment, the container 22 desirably includes a label 34 that is a laminate including a subsurface layer having an ink label printed thereon and a transparent outer layer that covers the ink printed label. The label may include one or more of the features disclosed in U.S. patent application Ser. No. 13/047,682, entitled SEALABLE AND STACKABLE PACKAGES FOR BEDDING PRODUCTS, filed by inventor Michael Fux on Mar. 14, 2011, the disclosure of which is hereby incorporated by reference herein. The transparent outer layer preferably provides a glossy appearance for the container 22. In one embodiment, the label 34 may be a printed foil label. In one embodiment, the label 34 may be secured to the outer surface of the container using glue or other well known attachment components.

Figure 2:
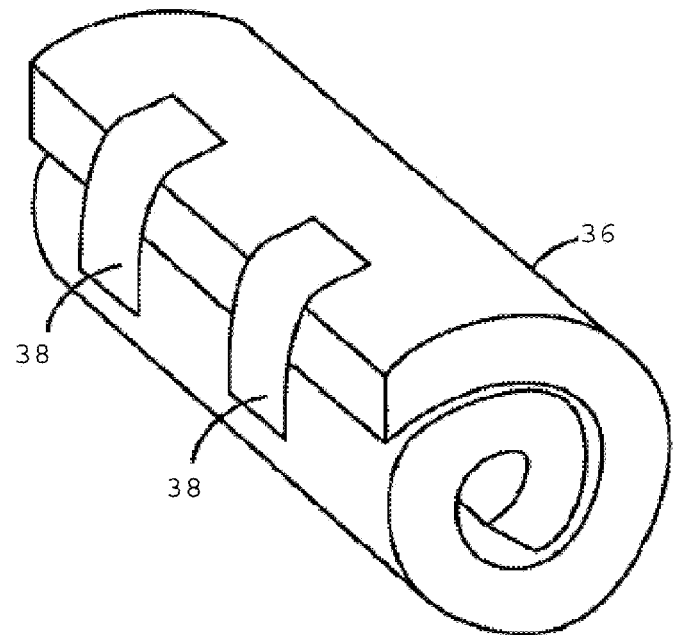
FIG. 2 shows a compressed mattress that is insertable into the wheeled mattress caddy of FIG. 1, in accordance with one embodiment of the present invention.

Referring to FIG. 2, in one embodiment, a compressed mattress 36 is configured for insertion into the container opening of the container 22 (FIG. 1). In one embodiment, the mattress may be compressed as disclosed in U.S. Pat. No. 4,711,067 and/or U.S. Patent Application Publication No. 2007/0074983, the disclosures of which are hereby incorporated by reference herein. In one embodiment, the compressed mattress 36 may be rolled around a core and held in a rolled configuration using tape 38.

Figure 3:
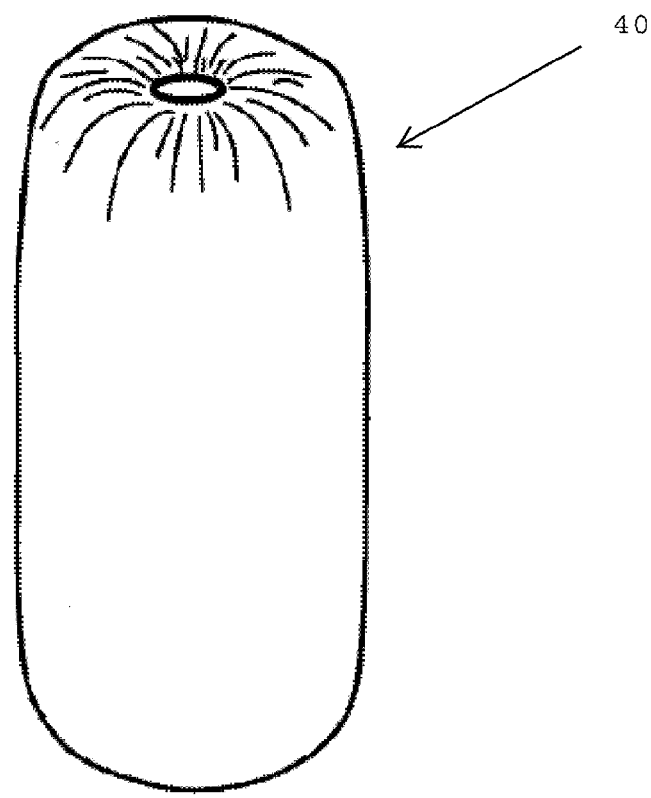
FIG. 3 shows the compressed mattress of FIG. 2 placed inside a flexible storage bag that is insertable into the wheeled mattress caddy of FIG. 1, in accordance with one embodiment of the present invention.

Referring to FIGS. 2 and 3, in one embodiment, the compressed and rolled mattress 36 is placed within a flexible storage bag 40 before it is placed inside the container 22 of the wheeled mattress caddy 20 (FIG. 1). The flexible storage bag 40 may have a draw string at an upper end. In one embodiment, when closed, the flexible storage bag may be vacuum sealed and/or hermetically sealed. In one embodiment, the flexible storage bag 40 may have vent openings formed therein.

Figure 4:
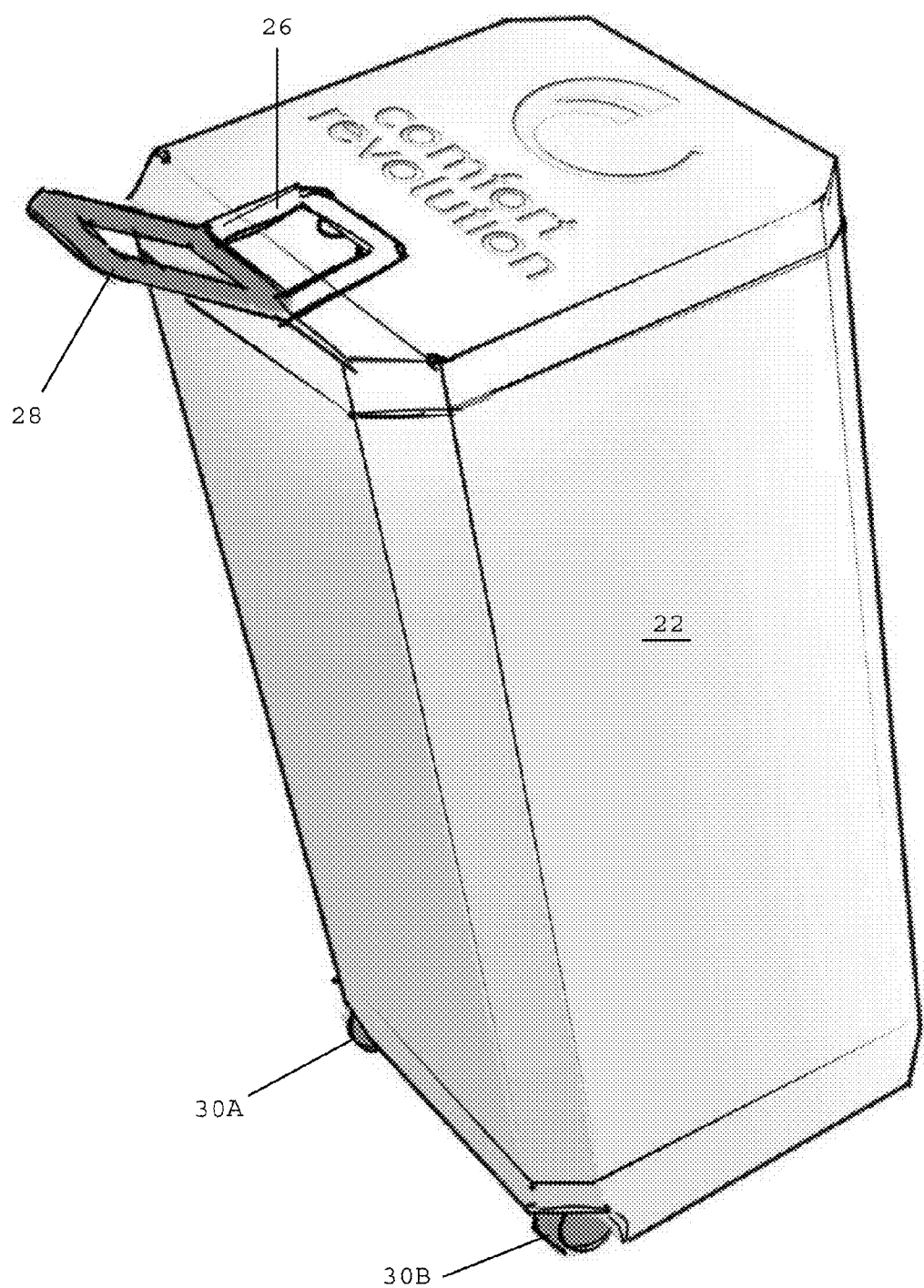
FIG. 4 shows the wheeled mattress caddy of FIG. 1 with the handle extended for tilting the mattress caddy onto the roller wheels for rolling the mattress caddy over a surface, in accordance with one embodiment of the present invention.

Referring to FIG. 4, in one embodiment, the wheeled mattress caddy 20 may be titled upon its wheels 30A, 30B for rolling the container 22 over a surface, such as a floor. In one embodiment, shown in FIG. 4, the handle 28 may be extended from the recess 26 for facilitating tilting of the container 22 onto its wheels 30A, 30B and transporting the mattress caddy 20 over a surface. When the container 22 has been rolled to a desired location, the container can be returned to the upright position shown in FIG. 1. The handle 28 may then be returned to the retraced position whereby the handle sits within the recess 26.

After the compressed mattress 36 (FIG. 2) has been removed from the container 22, the mattress caddy 20 may be re-used as a storage receptacle. Thus, in one embodiment, the present application discloses a container that minimizes waste.

Figure 5:
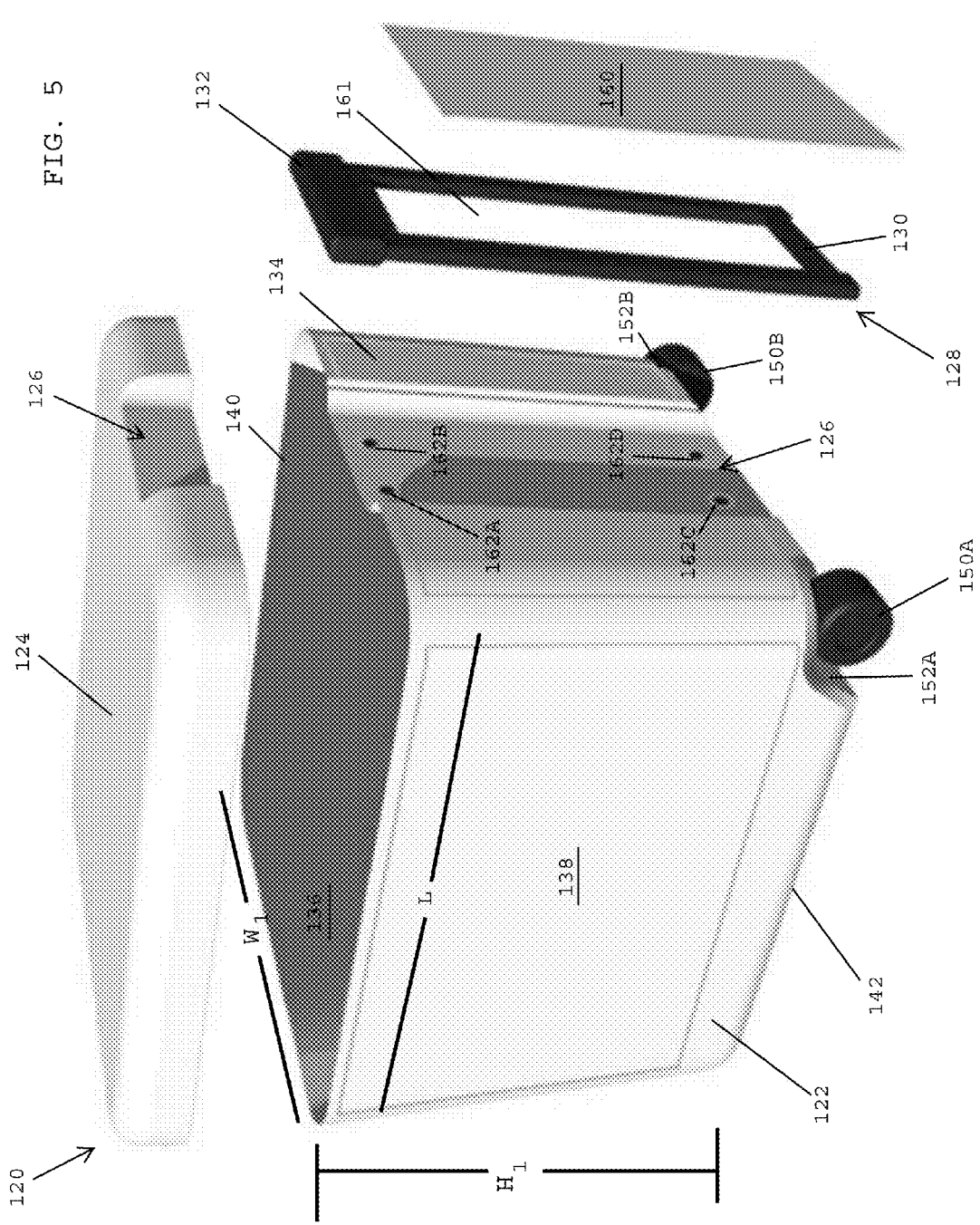
FIG. 5 shows an exploded view of a wheeled mattress topper caddy having a container, a top cover, a handle and wheels, in accordance with one embodiment of the present invention.

Referring to FIG. 5, in one embodiment, a wheeled mattress topper caddy 120 for storing a compressed mattress topper desirably includes a container 122 having a lid or top cover 124 that covers an opening at an upper end of the container 122. In one embodiment, the top cover 124 may be hingedly secured to the upper end of the container 122. In one embodiment, the top cover 124 may be a separate piece that is removed from the top of the container for accessing the inside of the container. The top cover 124 may be opened for providing access to the container opening so that a bedding product such as a compressed mattress topper may be placed into and/or removed from the container 122.

In one embodiment, a front edge of the top cover 124 and a front wall of the container 120 preferably has a recess 126 formed therein that is adapted to receive a handle 128. The handle 128 is preferably secured within the recess 126 of the front wall of the container 120 and the front edge of the top cover 124. In one embodiment, the handle 128 includes a base 130 that is secured within the recess 126 of the front wall of the container 120 and a hand grip 132 that is telescopically connected with the base 130.

Figure 6:
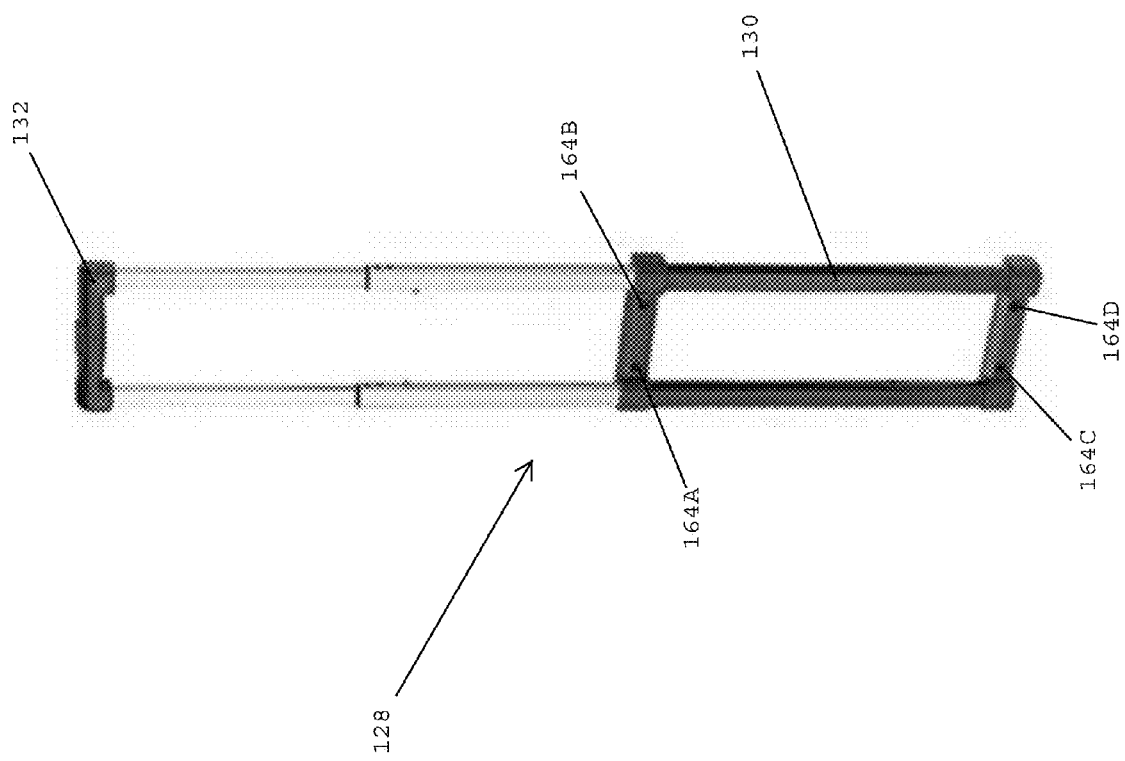
FIG. 6 shows the handle of FIG. 5 in an extended position for tilting the mattress topper caddy onto the wheels for rolling the mattress topper caddy over a surface, in accordance with one embodiment of the present invention.

Referring to FIGS. 5 and 6, in one embodiment, the handle 128 is extendable from the retracted position shown in FIG. 5 to the extended position shown in FIG. 6. In the retracted position, the hand grip 132 sits within the recess 126 provided at the front edge of the top cover 124. With the handle 128 in the retracted position, the mattress topper caddy has a generally square shape so that a plurality of mattress topper caddies may be stacked adjacent and/or atop one another. In the extended position shown in FIG. 6, the hand grip 132 may be grasped for facilitating movement of the mattress topper caddy 120 such as by tilting the container 122 onto roller wheels and rolling the mattress topper caddy 120 over a surface.

Referring to FIG. 5, in one embodiment, the container 122 has a four side walls, namely a front wall 134 having the recess 126, a rear wall 136 opposite the front wall 134, a first lateral side wall 138 extending between the front and rear walls, and a second lateral side wall 140 extending between the front and rear walls. The container has a bottom wall 142 that extends between lower ends of the front wall 134, the rear wall 136, and the first and second lateral side walls 138, 140 for closing the bottom of the container. The container has a container opening 144 at the upper end of the front wall 134, the rear wall 136, and the first and second lateral side walls 138, 140 for providing access to the inside of the container when the top cover 124 is removed. After a bedding product such as a mattress topper is passed through the container opening 144 and placed inside the container 122, the top cover 124 is placed over the container opening 144 for closing the container 122.

In one embodiment, the front, rear and lateral side walls of the container 120 may be embossed with a label or a design. In one embodiment, the top cover 124 may also be embossed with a label or a design.

Referring to FIG. 5, in one embodiment, the mattress topper caddy 120 is preferably designed for being stacked next to and/or atop other similarly configured mattress topper caddies. In one embodiment, the mattress topper caddy 120 has a box-like shape having a flat top, four flat sides and a flat bottom. The box-like shape enables the container 122 to be stacked next to and/or atop other similarly configured and dimensioned mattress topper caddies.

In one embodiment, the mattress topper caddy 120 preferably includes roller wheels 150A, 150B that are positioned within a pair of cutouts 152A, 152B formed along a front, lower edge of the container 122. The wheels 150A, 150B are preferably positioned on the same side of the container 122 as the handle 128. The wheels 150A, 150B are preferably recessed so that they do not extend outside the perimeter of the container 122. Although the present invention is not limited by any particular theory of operation, it is believed that providing recessed wheels 150A, 1500B that lie within the perimeter of the container 122 results in a smaller footprint around the base of the container 122 so that adjacent containers may be stacked closer together.

The mattress topper caddy 120 may be provided in different sizes for accommodating mattresses toppers having different sizes, e.g., King size, Queen size, twin, etc.

Referring to FIG. 5, in one embodiment, the container 122 has a length L of about 15-24", more preferably about 18-20", and even more preferably about 19". In one embodiment, the container 122 has a height H of about 10-20", more preferably about 14-16", and even more preferably about 15". In one embodiment, the container 122 has a width W of about 10-20", more preferably about 14-16", and even more preferably about 15".The size of the perimeter of the top cover 124 may be modified to fit a container opening of a container having the various dimensions outlined above.

In one embodiment, the mattress topper caddy may be made of polymer materials such as polypropylene. In one embodiment, the wheeled mattress topper caddy 120 may be made of plastic such as the wheeled rollout carts sold by Toter, Inc. of Statesville, N.C., www.toter.com, the disclosure of which is hereby incorporated by reference herein.

The plastic materials preferably protect the mattress topper disposed within the container 122. The plastic materials are preferably rugged so that the mattress toper caddy 120 may be re-used as a garbage can, recycling bin, or storage container after the mattress has been removed from the caddy.

In one embodiment, the wheeled mattress topper caddy 120 may be made of plastic using the rotational molding technology provided by MOD Custom Rotomolding of Ashtabula, Ohio, which is a custom molding division of Meese Orbitron Dunne Company, www.modroto.com, the disclosure of which is hereby incorporated by reference herein. MOD is a founding member of the Association of Rotational Molders International and a perennial winner of its rotomolding awards for excellence. MOD designs, develops, and manufactures a diverse array of plastic containers, carts, tanks and other products for hundreds of tough applications in the chemical, food, healthcare, laundry, lighting, home and garden and other industries. The company consistently ranks at the top of the Plastics News annual list of the country's largest rotational molders. In addition to its rotational molding and custom design engineering services, the company also offers a host of ancillary in-house services including a state-of-the-art powder coating operation, metal fabrication and cut and sew operations. MOD is the first rotomolder in North America to purchase the automated Leonardo rotational molding system and currently operates four manufacturing facilities in La Mirada, Calif.; Saddle Brook, N.J.; Ashtabula, Ohio and Madison, Ind. to provide fast, efficient product distribution at the lowest freight cost possible throughout the country and the world.

In one embodiment, the wheeled mattress topper caddy 120 may be made of plastic using the rotationally molded plastic technology disclosed by Sterling Technologies of Lake City, Pa., www.sterlingrotationalmolding.com, the disclosure of which is hereby incorporated by reference herein. Sterling provides product design, prototyping, tooling fabrication and management, production feasibility and optimization along with vast finishing options for bring products to market. Sterling produces a wide range custom rotomolded parts and components and is capable of molding very intricate parts in a wide range of sizes, colors, and textures, and with graphics and special finishes.

In one embodiment, the container 122 desirably includes a label that is a laminate including a subsurface layer having an ink label printed thereon and a transparent outer layer that covers the ink printed label. The label may include one or more of the features disclosed in commonly owned U.S. patent application Ser. No. 13/047,682, entitled SEALABLE AND STACKABLE PACKAGES FOR BEDDING PRODUCTS, filed by inventor Michael Fux on Mar. 14, 2011, the disclosure of which is hereby incorporated by reference herein. The transparent outer layer preferably provides a glossy appearance for the container 122. In one embodiment, the label may be a printed foil label. In one embodiment, the label may be secured to the outer surface of the container using glue or other well known attachment components. The label may also be secured to the top cover 124.

Referring to FIG. 5, in one embodiment, after the base of the handle 128 has been secured within the recess 126 formed in the front wall 134 of the container 122, a plate 160 may be secured over the base 130 of the handle. The plate 160 preferably covers an opening 162 in the base of the handle and may also cover the recess 126 formed in the front wall 134 of the container 122 to provide a continuous, flat surface along the front wall of the container.

Referring to FIGS. 5 and 6, in one embodiment, the recess 126 within the front wall 134 of the container 122 may have fastener openings 162A-162D used for securing the handle 128 to the front wall of the container 122. Fasteners (not shown) may be passed through fastener openings 164A-164D formed in the base 130 of the handle 128 for securing the handle 128 to the container 122.

Figure 7:
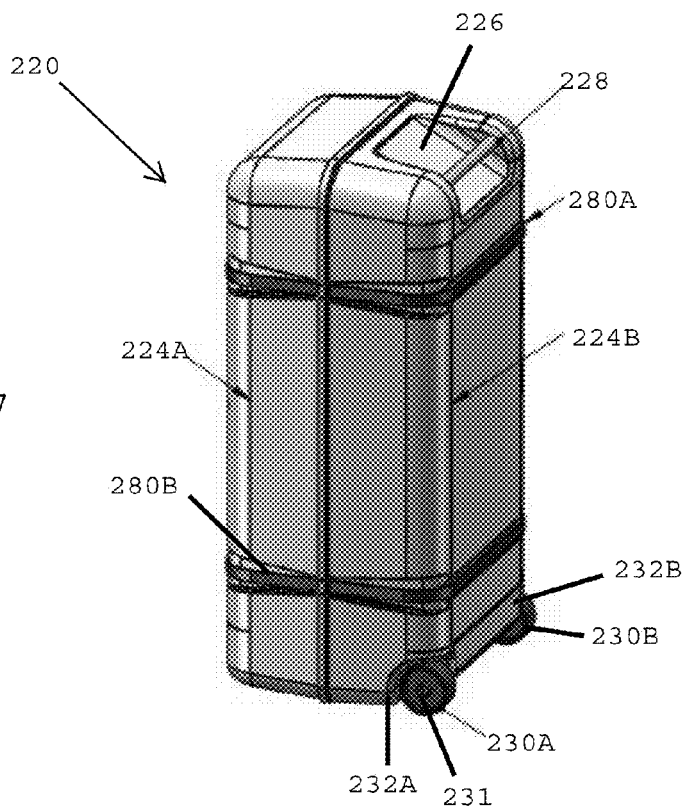
FIG. 7 shows a perspective view of a wheeled container for bedding products, in accordance with another embodiment of the present invention.

Referring to FIG. 7, in one embodiment, a wheeled mattress caddy 220 preferably includes a container 222 having a front container half 224A and a rear container half 224B. The rear container half 224B preferably has an upper end including a recess 226 formed therein with a handle 228, such as a one inch diameter aluminum tube, attached to the container and extending across the width of the recess 226. The handle 228 is preferably retained within openings provided on each side of the recess 226.

In one embodiment, the wheeled container 220 preferably includes first and second roller wheels 230A, 230B that are mounted onto the ends of an elongated shaft 231. The lower end of the rear container half 224 preferably includes cutouts 232 that accommodate the respective first and second roller wheels 230A, 230B. In one embodiment, the roller wheels are recessed within the cutouts.

Figure 8:
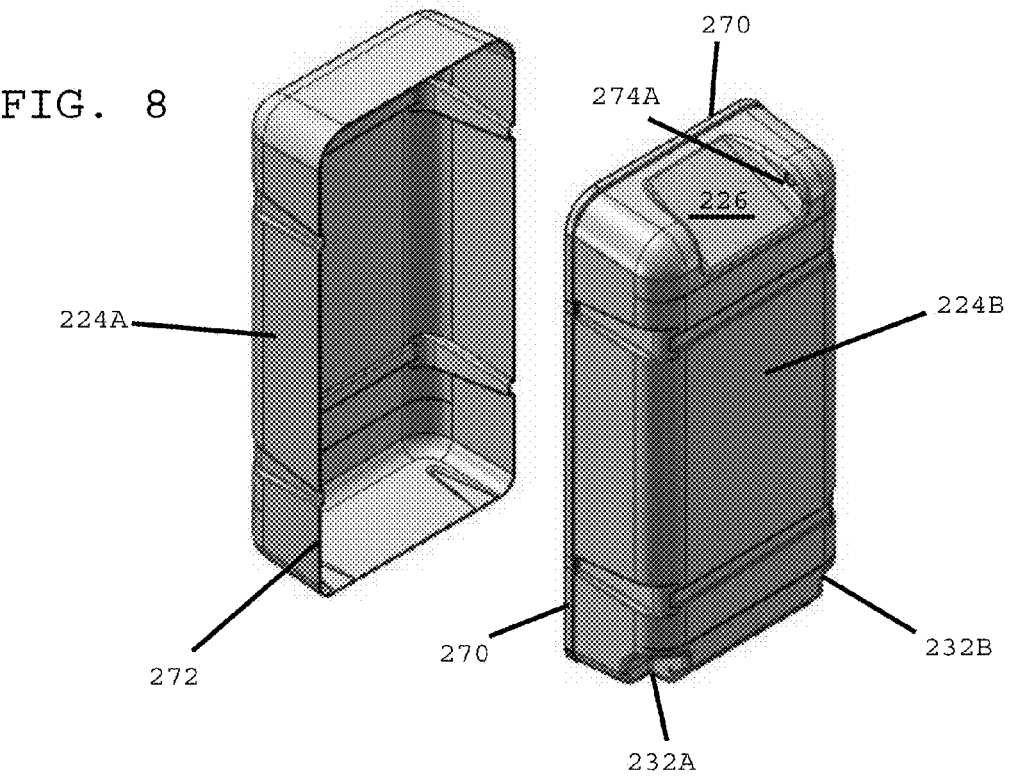
FIG. 8 shows a front container half and a rear container half of the wheeled container shown in FIG. 7, in accordance with one embodiment of the present invention.

Referring to FIG. 8, in one embodiment, the container 222 preferably includes the front container half 224A and the rear container half 224B that are used for enclosing a mattress or other bedding product therein. In one embodiment, the front and rear container halves 224, 224B are generally similar to a clam-shell container whereby the front container half 224A has a slightly smaller outer perimeter that fits within the slightly larger outer perimeter of the rear container half 224B.

In one embodiment, the rear container half 224B preferably includes an outer rim 270 that extends around the perimeter of the rear container half. The rim 270 preferably surrounds the inner edge 272 of the front container half 224A when the front and rear container halves are assembled together.

Referring to FIG. 8, in one embodiment, the rear container half 224B preferably includes a recess 226 formed at the upper end thereof. The recess 226 includes a first opening (not shown) and a second opening 274B that are adapted to receive the handle 228 shown in FIG. 7 above. The lower end of the rear container half 224B includes the pair of cutouts 232A, 232B that receive the roller wheels 230A, 230B shown above in FIG. 7.

Referring to FIGS. 9A-9E, in one embodiment, the front container half 224A is preferably a molded component, such as a thermoformed structure. Referring to FIGS. 9A, 9B and 9E, in one embodiment, ribs 276 may be molded into the side, top and/or bottom walls of the first container half 224A for strengthening the structure.

Referring to FIG. 9A, in one embodiment, the outer surface of the front container half 224A preferably includes a pair of molded grooves 278A, 278B that are formed in the outer surface of the front container half 224A. In one embodiment, the grooves 278A, 278B are substantially parallel to one another.

Referring to FIG. 9C, in one embodiment, the front container half 224A preferably has a height $H_2$ of about 40-50 inches and more preferably about 45 inches, and a width $W_2$ of about 20-25 inches and more preferably about 22 inches. Referring to FIG. 9D, in one embodiment, the front container half 224A has a depth $D_2$ of about 8-10 inches and more preferably about 9.49 inches.

Referring to FIGS. 10A-10E, in one embodiment, the rear container half 224B preferably includes a molded shell that is adapted for being assembled with the front container half 224A shown in FIGS. 9A-9E. The rear container half 224B preferably includes the recess 226 formed at the upper end thereof having a first opening 274A and an opposing second opening 274B adapted to receive the handle 228 shown in FIG. 7.

The lower end of the rear cover half 224B preferably includes the first cutout 232A and the second cutout 232B adapted to receive the first and second roller wheels 230A, 230B shown in FIG. 7.

In one embodiment, the rear container half 224B has one or more ribs 277 molded therein for improving the strength and rigidity of the rear container half.

In one embodiment, the rear container half 224B preferably includes a pair of grooves 279A, 279B that are molded into an outer surface thereof and that extend around the outer surface of the rear cover half 224B. The pair of grooves 279A, 279B are preferably parallel to one another.

Referring to FIG. 10C, in one embodiment, the rear container half 224B preferably has a height $H_3$, a width $W_3$, and a depth $D_3$ that is slightly greater than the associated measurements found on the front cover half 224A. In one embodiment, the rear cover half 224B preferably has a height $H_3$ of about 40-50 inches and more preferably about 45.39 inches, a width $W_3$ of about 20-25 inches and more preferably about 22.40 inches, and a depth $D_3$ of about 8-11 inches and more preferably about 10.18 inches.

Referring to FIGS. 10A and 10D, in one embodiment, when the front and rear cover halves are assembled together, the rear cover half 224 preferably includes an outer rim 270 that extends around the perimeter of the inner face of the rear cover half. In one embodiment, when the front and rear cover halves are assembled together, the inner edge of the front cover half is preferably seated within the outer rim 270 of the rear cover half to form a reliable connection and/or seal between the front and rear cover halves.

Figure 11A:
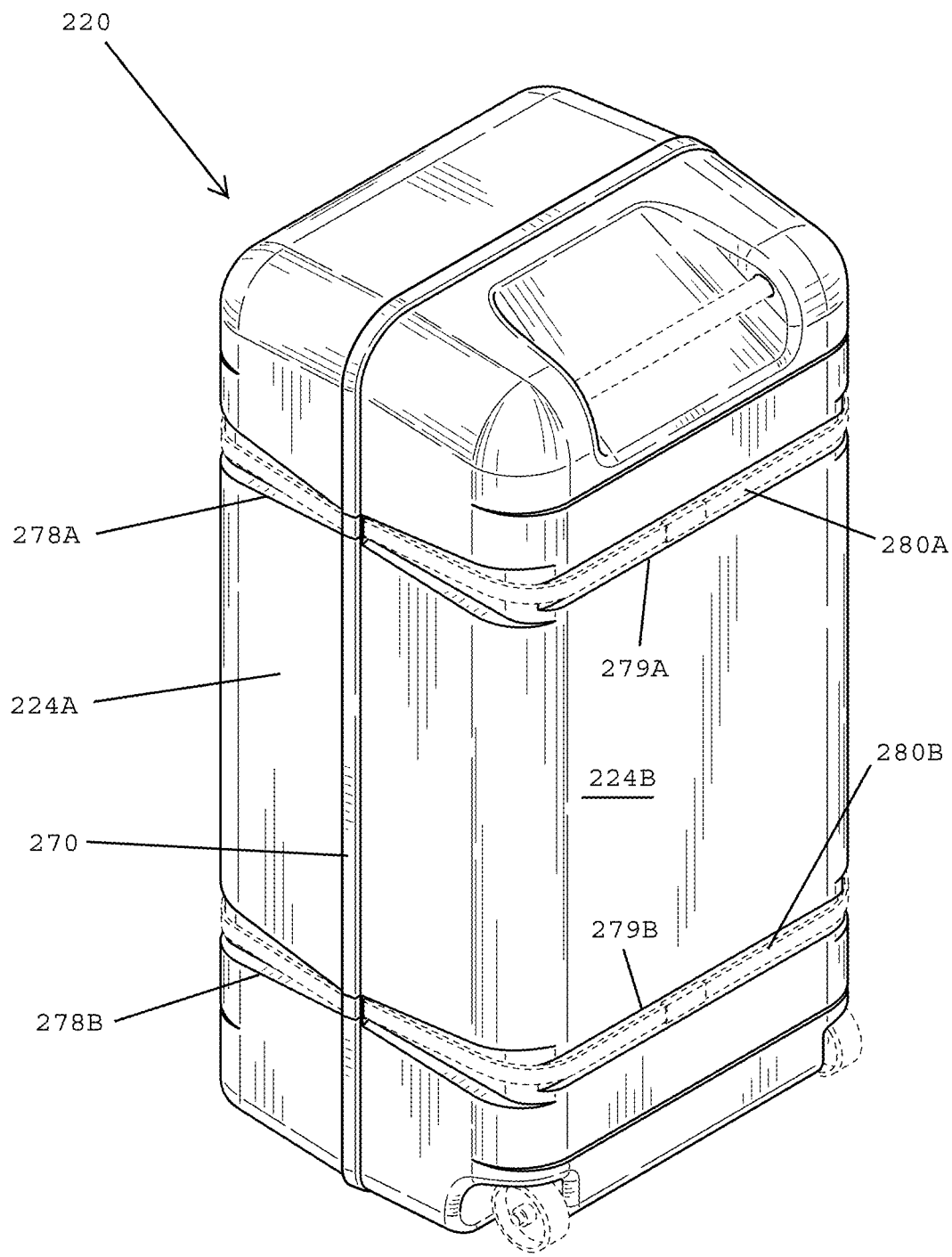
FIG. 11A shows a perspective view of the wheeled container of FIG. 7.

Referring to FIG. 11A, in one embodiment, a bedding product, such as a folded mattress, a compressed memory foam mattress, or a mattress topper may be placed within the wheeled container 220. In one embodiment, before being placed within the wheeled container, a memory foam mattress is compressed and, while still compressed, disposed within a sealed outer flexible bag as shown and described above in FIGS. 2 and 3 of the present application.

In one embodiment, after a bedding product has been positioned between the front cover half 224A and the rear cover half 224B, the front and rear cover halves may be assembled together so that the outer rim 270 of the rear cover half 224B surrounds the opposing inner edge of the front cover half 224A.

In one embodiment, in order to reliably secure the front and rear cover halves 224A, 224B together, a first flexible strap 280A is positioned within the first groove 278A of the front cover half 224A and the first groove 279A provided in the rear cover half 224B for wrapping the strap around the outside of the container 220. The flexible strap 280A preferably extends about the perimeter of the first and second cover halves 224A, 224B for holding the two halves together. In one embodiment, the flexible strap 270A preferably has a width of about one inch and may have hook and loop fasteners for securing the ends of the flexible strap together.

In one embodiment, the wheeled container 220 preferably includes a second flexible strap 280B that is seated in the second grove 278B of the front cover half 224A and the second groove 279B provided in the rear cover half 224B for wrapping the strap around the outside of the container. The second flexible strap 280B is preferably seated within the bottom grooves 278B, 279B and wraps around the first and second cover halves 224A, 224B for holding the two cover halves together. The second flexible strap 280B preferably has a width of about one inch and may have hook and loop fasteners at the ends thereof for holding the ends of the flexible strap together.

Figure 11B:
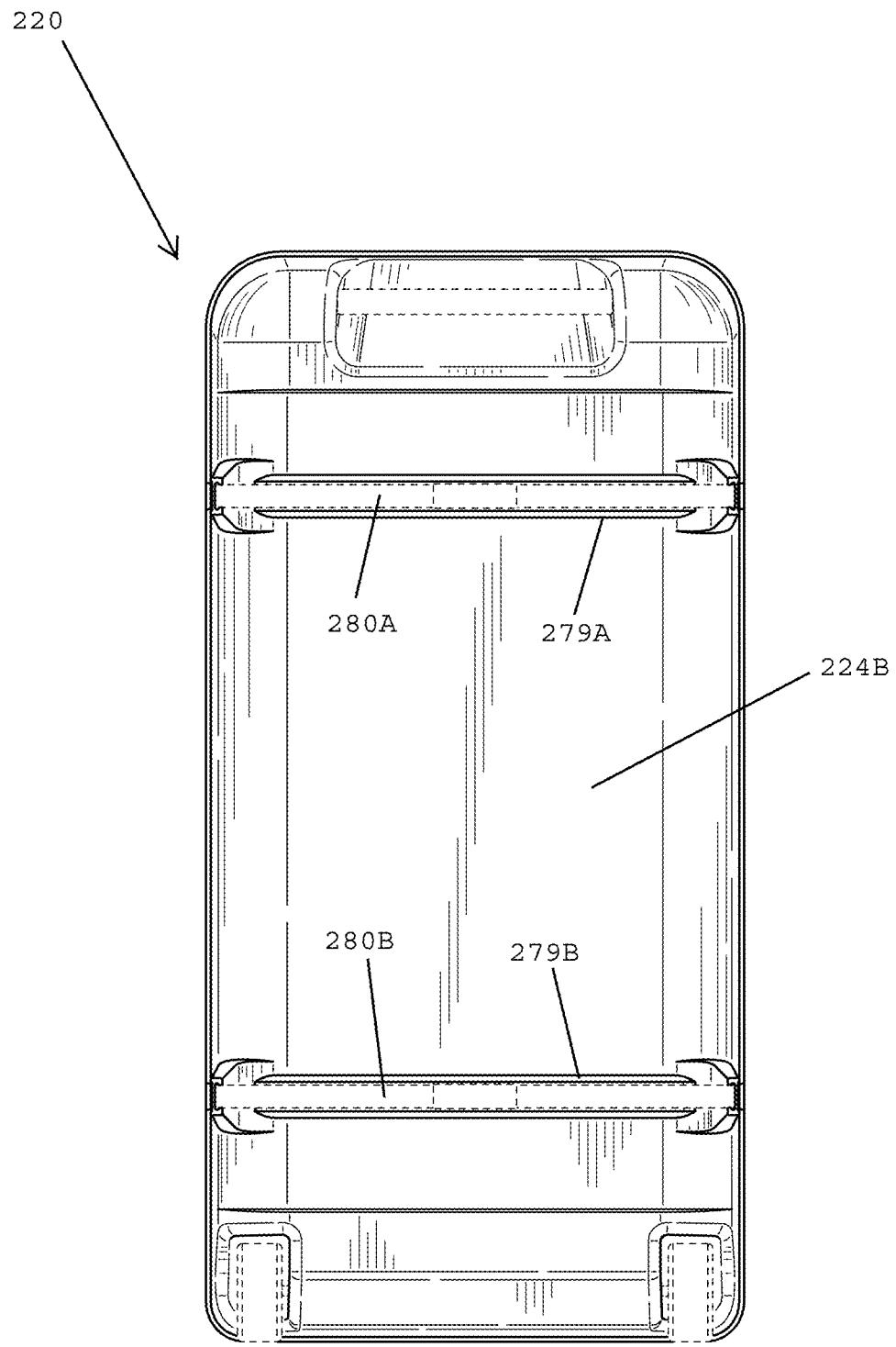
FIG. 11B is a front elevation view of the wheeled container shown in FIG. 11A.

FIG. 11B shows the first and second straps 280A, 280B secured within the first and second grooves 279A, 279B, respectively, molded into the rear cover half 224B.

Figure 11C:
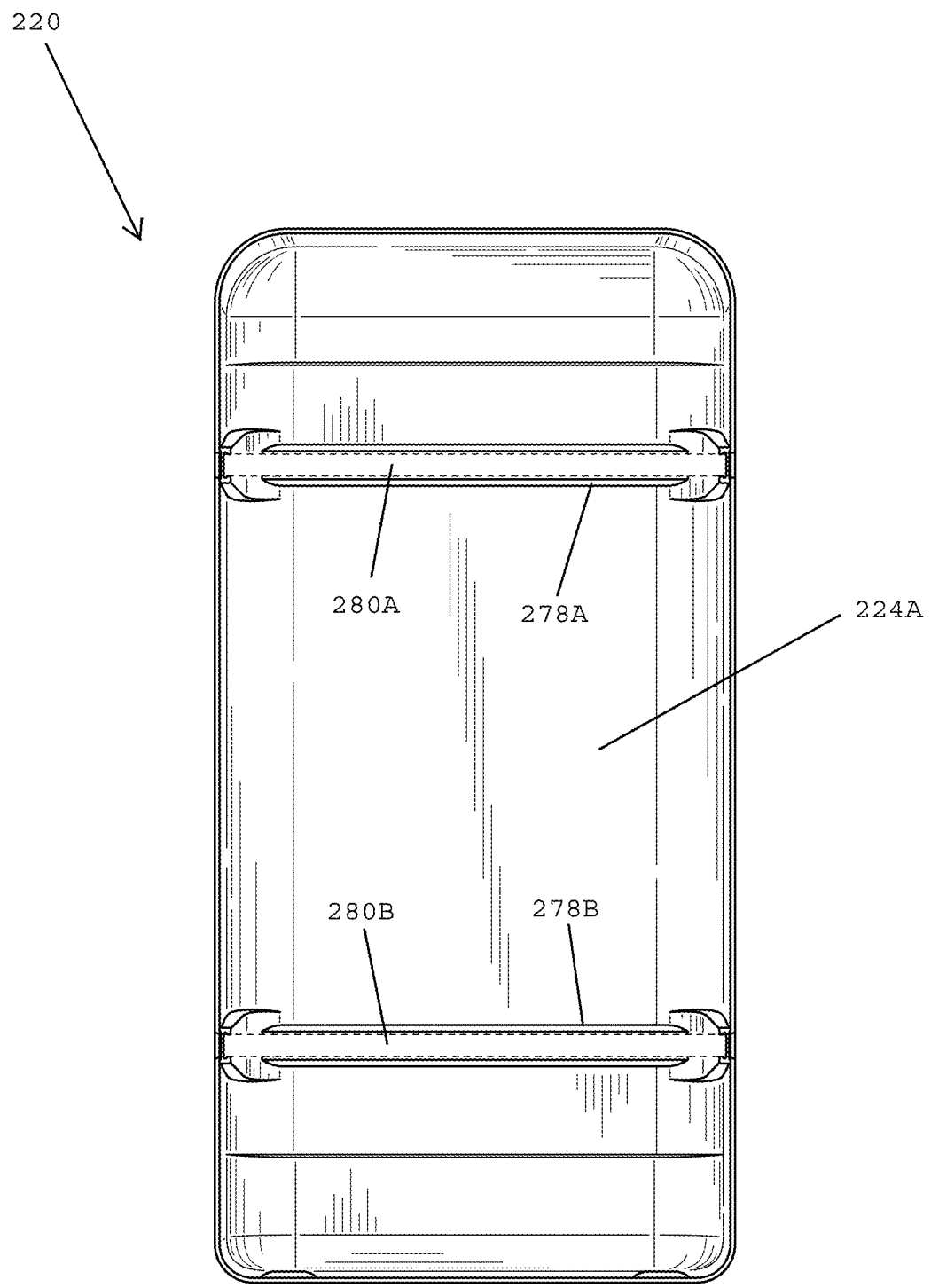
FIG. 11C is a rear elevation view of the wheeled container shown in FIG. 11A.

FIG. 11C shows the front cover half 224A with the first flexible strap 280A seated in the first groove 278A molded in the front cover half and the second flexible strap 280B seated in the second groove 278B molded in the front cover half.

Figure 11D:
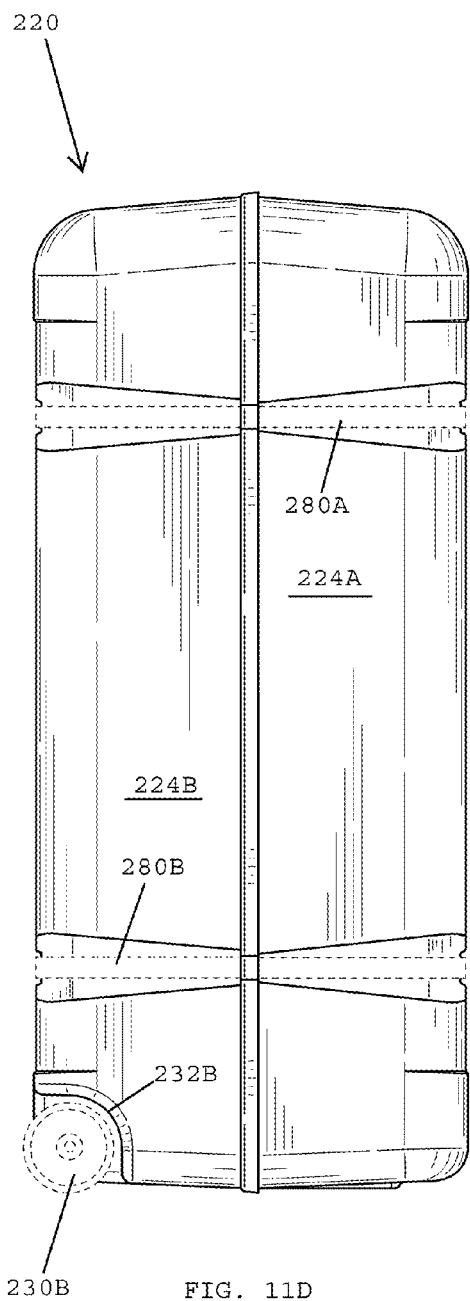
FIG. 11D is a right side view of the wheeled container shown in FIG. 11A.
Figure 11E:
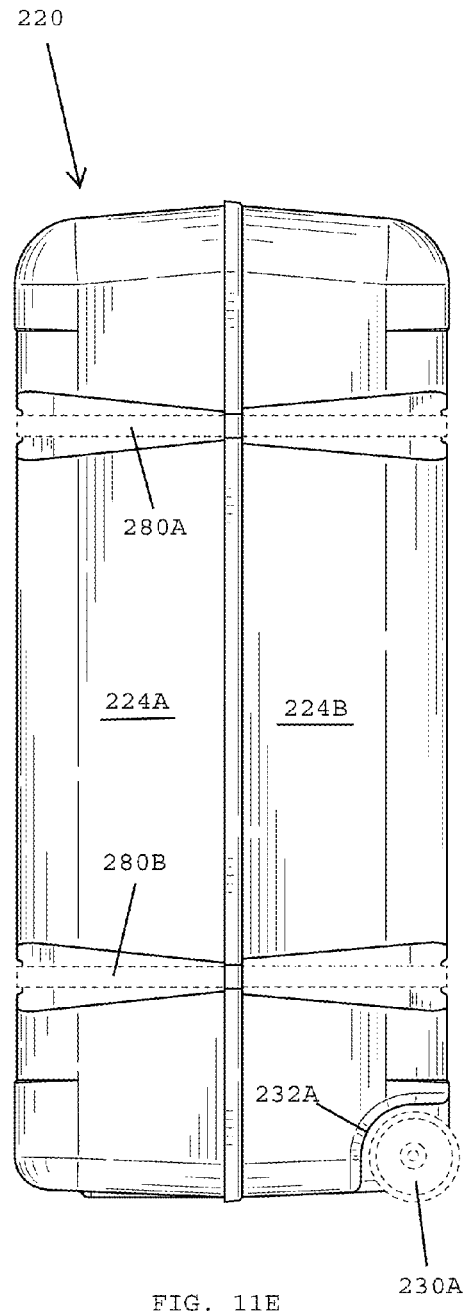
FIG. 11E is a left side view of the wheeled container shown in FIG. 11A.

FIGS. 11D and 11E show the front and rear cover halves 224A, 224B assembled together with the first and second flexible straps 280A, 280B seated in the grooves provided in the front and rear cover halves for holding the front and rear cover halves together. The first and second roller wheels 230A, 230B are seated within the respective cutouts 232A, 232B molded into the lower end of the rear cover half 224B. The first and second roller wheels are preferably recessed within the first and second cutouts so that the wheeled container 220 may sit upright and level to the ground, without the wheels enabling rolling movement of the container when the container is stored in the upright position.

Figure 11F:
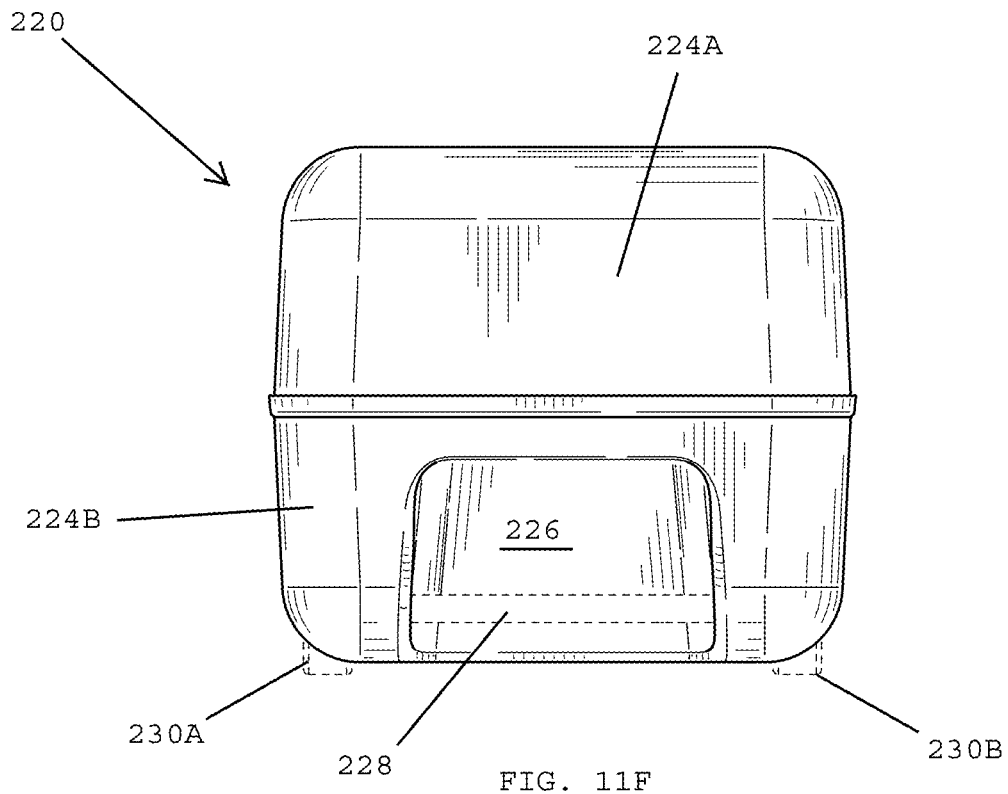
FIG. 11F is a top plan view of the wheeled container shown in FIG. 11A.

Referring to FIG. 11F, the handle 228 preferably extends across the width of the recess 226 that is molded into the upper end of the rear cover half 224B. The first and second roller wheels 230A, 230B are disposed at the lower end of the rear cover half 224B for selectively rolling the container 220 when the container is tilted onto the wheels.

Referring to 11G, in one embodiment, the first and second roller wheels 230A, 230B may extend slightly beyond the outer face 284 of the rear cover half 224B. The first and second roller wheels 230A, 230B are preferably disposed within the first and second cutouts 232A, 232B molded into the lower end of the rear cover half 224B. The rim 270 of the rear cover half 224B surrounds the opposing inner edge of the front cover half 224A.

Figure 11G:
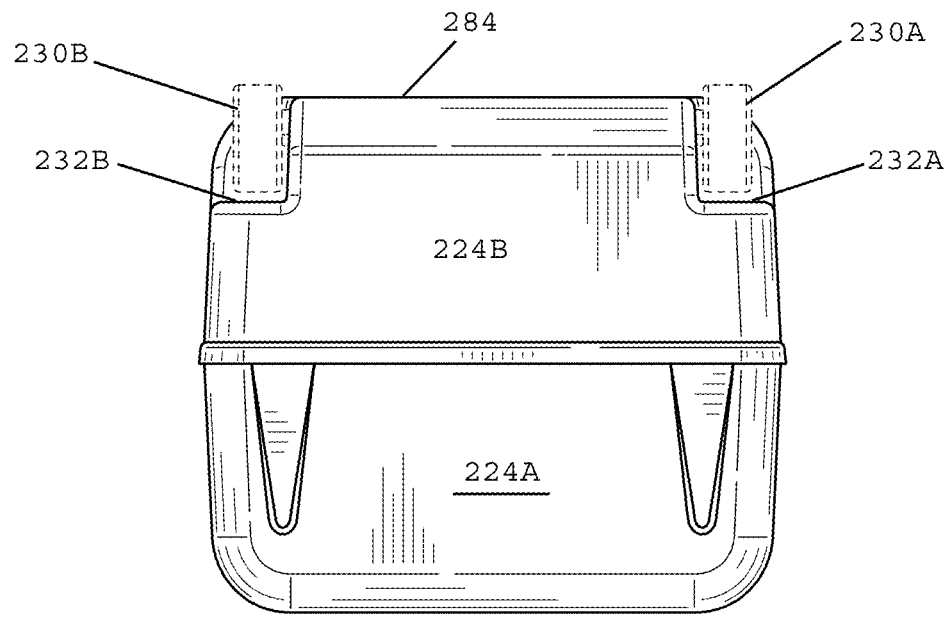
FIG. 11G is a bottom plan view of the wheeled container shown in FIG. 11A.

Referring to FIGS. 11F and 11G, in one embodiment, the handle 228 is grasped for tilting the container 220 onto the first and second wheels 230A, 230B for rolling the container over a surface to a desired location. When the desired location has been reached, the handle 228 may be used for tilting the container 220 back to the upright position, whereupon the container does not roll on the wheels 230A, 230B.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A wheeled container for bedding products comprising:
    a container including an upper end and a lower end having a bottom surface that extends to a lower edge of said container;
    a pair of wheels rotatably mounted to said container at the lower edge of said container;
    a handle mounted to said container, wherein said handle is mounted on the same side of said container as said pair of wheels;
    a bedding product disposed inside said container, wherein said container has a storage configuration in which a bottom face of said container is parallel to the ground, and a moving configuration in which said container is tilted onto said pair of wheels for rolling said container over the ground;
    said container comprising a front container half and a rear container half that are assembled together for storing said bedding product inside said container; and
    first and second flexible straps wrapped around the outside of said container for holding said front and rear container halves together, wherein said front container half has an outer surface including first and second grooves formed therein that are parallel to one another and said rear container half has an outer surface including first and second grooves formed therein that are parallel to one another, said first flexible strap being positioned within said first groove on said front container half and said first groove on said rear container half, and said second flexible strap being positioned within said second groove on said front container half and said second groove on said rear container half.

2. The wheeled container as claimed in claim 1, wherein when said container is in the moving configuration said bottom face of said container is non-parallel to the ground.

3. The wheeled container as claimed in claim 1, wherein said upper end of said container has a recess formed therein and said handle extends across said recess.

4. The wheeled container as claimed in claim 3, wherein said handle is secured to the upper end of said container.

5. The wheeled container as claimed in claim 1, wherein said container has a box-like shape with said pair of wheels being mounted along a lower rear edge of said container and said handle being accessible at an upper rear edge of container.

6. The wheeled container as claimed in claim 1, wherein said bedding product is a folded and compressed mattress that is disposed within a sealed flexible bag, which, in turn, is disposed within said container.

7. The wheeled container as claimed in claim 6, wherein said mattress is a compressed memory foam mattress.

8. The wheeled container as claimed in claim 1, wherein said bedding product is a mattress topper.

9. The wheeled container as claimed in claim 1, wherein said first and second roller wheels are rotatably mounted to the lower end of said rear container half and said handle is mounted to the upper end of said rear container half.

10. A wheeled container for a mattress comprising:
    a folded mattress placed inside a sealed, flexible bag;
    a front container half having an upper end and a lower end, said front container half having an outer surface including first and second grooves formed therein;
    a rear container half having an upper end and a lower end, said rear container half having an outer surface including first and second grooves formed therein, wherein said front and rear container halves are assembled together for storing said folded mattress between said assembled front and rear container halves;
    first and second flexible straps wrapped around said front and rear container halves for holding said front and rear container halves together, wherein said first flexible strap is positioned within said first groove on said front container half and said first groove on said rear container half, and wherein said second flexible strap is positioned within said second groove on said front container half and said second groove on said rear container half;
    a pair of wheels rotatably mounted to said container at a lower end of said rear container half;
    a handle secured to said container and being accessible at an upper end of said rear container half, wherein said container has a storage configuration in which a bottom face of said container is parallel to the ground, and a moving configuration in which said container is tilted onto said pair of wheels for rolling said container over the ground.

11. The wheeled container as claimed in claim 10, wherein said container has a box-like shape and said front and rear container halves are made of thermoformed polymers.

12. The wheeled container as claimed in claim 10, wherein said folded mattress is a memory foam mattress that is compressed and folded for being stored inside said container, and wherein said sealed, flexible bag is hermetically sealed.

13. The wheeled container as claimed in claim 11, further comprising a plurality of said wheeled containers that are stackable atop and adjacent one another when said containers are in the storage configuration.

14. The wheeled container as claimed in claim 1, wherein each said flexible strap comprises hook and loop fasteners for securing the ends of each said flexible strap together.

15. A wheeled container for bedding products comprising:
    a container including an upper end and a lower end having a bottom surface that extends to a lower edge of said container;
    a pair of wheels rotatably mounted to said container at the lower edge of said container;

a handle mounted to said container, wherein said handle is mounted on the same side of said container as said pair of wheels;

a bedding product disposed inside said container, wherein said container has a storage configuration in which a bottom face of said container is parallel to the ground, and a moving configuration in which said container is tilted onto said pair of wheels for rolling said container over the ground;

said container comprising a front container half and a rear container half that are assembled together for storing said bedding product inside said container; and first and second flexible straps wrapped around the outside of said container for holding said front and rear container halves together, wherein said front container half has an outer surface including first and second grooves formed therein and said rear container half has an outer surface including first and second grooves formed therein, said first flexible strap being positioned within said first groove on said front container half and said first groove on said rear container half, and said second flexible strap being positioned within said second groove on said front container half and said second groove on said rear container half, wherein said front and rear container halves are made of thermoformed polymers, and wherein said grooves are molded into said outer surfaces of said front and rear container halves.

16. The wheeled container as claimed in claim 10, wherein each said flexible strap comprises hook and loop fasteners for securing the ends of each said flexible strap together.

17. The wheeled container as claimed in claim 10, wherein said first and second grooves formed in said front container half are parallel to one another, and said first and second grooves formed in said rear container half are parallel to one another.

18. The wheeled container as claimed in claim 11, wherein said grooves are molded into said outer surfaces of said front and rear container halves.

\* \* \* \* \*